US008627592B2

(12) United States Patent
Sloop

(10) Patent No.: US 8,627,592 B2
(45) Date of Patent: Jan. 14, 2014

(54) TELESCOPABLE STRUT FOR TURKEY DECOY

(76) Inventor: Stephen S. Sloop, Woodbine, GA (US)

( * ) Notice: Subject to any disclaimer, the term of this patent is extended or adjusted under 35 U.S.C. 154(b) by 312 days.

(21) Appl. No.: 12/928,240

(22) Filed: Dec. 6, 2010

(65) Prior Publication Data

US 2011/0283591 A1 Nov. 24, 2011

Related U.S. Application Data

(60) Provisional application No. 61/395,838, filed on May 18, 2010.

(51) Int. Cl.
*A01M 31/06* (2006.01)

(52) U.S. Cl.
USPC ............................................................ 43/2

(58) Field of Classification Search
USPC ........... 43/2, 3; 248/530, 532, 87, 156, 163.1, 248/165; 119/786; 52/155, 165; 135/118
See application file for complete search history.

(56) References Cited

U.S. PATENT DOCUMENTS

| | | | | |
|---|---|---|---|---|
| 261,910 | A | * | 8/1882 | Cochel ................. 43/3 |
| 282,851 | A | * | 8/1883 | Danz, Jr. .............. 43/3 |
| 283,195 | A | * | 8/1883 | Benjamin ............. 43/3 |
| 740,293 | A | * | 9/1903 | Loeble ................. 43/3 |
| 843,588 | A | * | 2/1907 | Ditto ................... 43/3 |
| 957,750 | A | * | 5/1910 | Cunningham ........ 43/3 |
| 1,438,074 | A | * | 12/1922 | Welch ................ 52/165 |
| 1,577,612 | A | * | 3/1926 | Dees ................. 248/532 |
| 1,976,264 | A | * | 10/1934 | Miner et al. ........ 52/165 |
| 2,011,480 | A | * | 8/1935 | Gazalski et al. ....... 43/3 |
| 2,256,778 | A | * | 9/1941 | Lundgren .............. 43/3 |
| 2,438,388 | A | * | 3/1948 | Dolk ................. 248/532 |
| 2,536,736 | A | * | 1/1951 | Gazalski ............... 43/3 |
| 2,711,608 | A | * | 6/1955 | Fulster ................. 43/3 |
| 2,736,120 | A | * | 2/1956 | Lestin ................... 43/3 |
| 2,787,074 | A | * | 4/1957 | Miller ................... 43/3 |
| 2,970,630 | A | * | 2/1961 | Larsen et al. ...... 248/532 |
| 3,256,655 | A | * | 6/1966 | Teeter ................ 52/155 |
| 3,318,560 | A | * | 5/1967 | Garrette, Jr. et al. ... 248/532 |
| 3,800,457 | A | * | 4/1974 | Barrett ................. 43/3 |
| 3,858,833 | A | * | 1/1975 | Fink ................. 248/530 |
| 3,869,823 | A | * | 3/1975 | Powers et al. ......... 43/3 |

(Continued)

FOREIGN PATENT DOCUMENTS

| FR | 2646588 A1 * | 11/1990 | ............ A01M 31/06 |
|---|---|---|---|
| WO | WO 2008111966 A1 * | 9/2008 | ............ A01M 31/06 |

*Primary Examiner* — Darren W Ark
(74) *Attorney, Agent, or Firm* — Alfred D. Lobo

(57) ABSTRACT

A turkey decoy comprises a mass-producable synthetic resinous body adapted to be deployed in either a sentry or feeding position, with a telescopable assembly of rigid, that is, essentially inflexible, upper and lower struts, the upper necessarily being tubular, and the lower being either tubular or solid. The upper strut is removably securely fixed in an aperture in the upper surface of the decoy's body. Typically, the strut assembly is pre-assembled in the decoy so that neither strut in the assembly is detachable relative to the other. The strut assembly of non-detachably assembled struts, which assembly is secured in the decoy long before the decoy is to be deployed, allows a hunter to transport the pre-assembled decoy to the desired site in the poor light of the pre-dawn hours, unfold the decoy, pull the inner strut out until it locks in the outer strut, and thrust the pointed end into the ground. There is no assembly of the strut on site, no searching for the desired aperture in the dark.

8 Claims, 4 Drawing Sheets

(56) References Cited

U.S. PATENT DOCUMENTS

| | | | | |
|---|---|---|---|---|
| 3,898,756 | A * | 8/1975 | Tolle | 43/21.2 |
| 3,924,345 | A * | 12/1975 | Sapp | 43/21.2 |
| 3,939,591 | A * | 2/1976 | Schwartztrauber | 43/3 |
| 4,131,122 | A * | 12/1978 | Brooks | 248/532 |
| 4,339,887 | A * | 7/1982 | Streeter | 43/2 |
| 4,611,421 | A * | 9/1986 | Jacob | 43/2 |
| 4,625,937 | A * | 12/1986 | Haase | 248/156 |
| 4,640,038 | A * | 2/1987 | Jershin | 43/2 |
| 4,658,534 | A * | 4/1987 | McLean | 248/532 |
| 4,700,502 | A * | 10/1987 | McFarland et al. | 43/21.2 |
| 4,748,762 | A * | 6/1988 | Campbell | 43/21.2 |
| 4,965,953 | A * | 10/1990 | McKinney | 43/2 |
| 5,108,058 | A * | 4/1992 | White | 248/532 |
| 5,144,764 | A * | 9/1992 | Peterson | 43/3 |
| 5,168,649 | A * | 12/1992 | Wright | 43/2 |
| 5,199,204 | A * | 4/1993 | Lowery | 43/2 |
| 5,217,194 | A * | 6/1993 | Brownell | 248/530 |
| 5,392,554 | A * | 2/1995 | Farstad et al. | 43/3 |
| 5,474,191 | A * | 12/1995 | Bergeron et al. | 248/156 |
| 5,488,798 | A * | 2/1996 | Beachel | 248/530 |
| 5,515,637 | A * | 5/1996 | Johnson | 43/2 |
| 5,546,692 | A * | 8/1996 | Byers | 43/2 |
| 5,639,057 | A * | 6/1997 | Yeomans | 248/530 |
| 6,199,569 | B1 * | 3/2001 | Gibson | 52/157 |
| 6,216,382 | B1 * | 4/2001 | Lindaman | 43/2 |
| 6,216,998 | B1 * | 4/2001 | Butrymowicz et al. | 248/530 |
| 6,318,017 | B1 * | 11/2001 | Genardo | 43/21.2 |
| 6,374,529 | B1 * | 4/2002 | Petroski et al. | 43/3 |
| 6,385,895 | B1 * | 5/2002 | Scaries | 43/2 |
| 6,408,559 | B2 * | 6/2002 | Mathews | 43/3 |
| 6,442,884 | B1 * | 9/2002 | Sceery | 43/2 |
| 6,449,894 | B1 * | 9/2002 | Price et al. | 43/3 |
| 6,481,147 | B2 * | 11/2002 | Lindaman | 43/2 |
| 6,484,431 | B2 * | 11/2002 | Price et al. | 43/3 |
| 6,487,781 | B2 * | 12/2002 | Johnson | 248/530 |
| 6,487,810 | B1 * | 12/2002 | Loughman | 43/2 |
| 6,547,203 | B1 * | 4/2003 | Willard | 248/530 |
| 6,675,522 | B2 * | 1/2004 | Mathews | 43/3 |
| 6,775,943 | B2 * | 8/2004 | Loughman | 43/2 |
| 6,901,693 | B1 * | 6/2005 | Crowe | 43/2 |
| 7,484,699 | B1 * | 2/2009 | Ziegler et al. | 248/530 |
| 7,562,487 | B2 * | 7/2009 | Barr | 43/2 |
| 7,568,306 | B1 * | 8/2009 | Rice, Sr. | 248/530 |
| 7,784,213 | B1 * | 8/2010 | Primos | 43/2 |
| 8,230,638 | B1 * | 7/2012 | Dunaway | 43/2 |
| 8,316,575 | B2 * | 11/2012 | Bradley | 43/2 |
| 2002/0162268 | A1 * | 11/2002 | Fulcher | 43/3 |
| 2003/0234334 | A1 * | 12/2003 | Kenney | 248/530 |
| 2004/0169121 | A1 * | 9/2004 | Winn | 248/530 |
| 2006/0053675 | A1 * | 3/2006 | Lindaman | 43/2 |
| 2006/0097124 | A1 * | 5/2006 | Kenney | 248/530 |
| 2006/0143969 | A1 * | 7/2006 | Lindaman | 43/2 |
| 2007/0251135 | A1 * | 11/2007 | Watlov et al. | 43/3 |
| 2008/0209792 | A1 * | 9/2008 | Watlov | 43/2 |
| 2009/0007479 | A1 * | 1/2009 | Jerome, Sr. | 43/2 |
| 2010/0115818 | A1 * | 5/2010 | Rogers | 43/2 |
| 2010/0200724 | A1 * | 8/2010 | Kukuk | 248/530 |
| 2012/0180371 | A1 * | 7/2012 | Roe | 43/2 |
| 2012/0240447 | A1 * | 9/2012 | Gurner, III | 43/2 |

* cited by examiner

TELESCOPABLE STRUT FOR TURKEY DECOY

CROSS-REFERENCE TO RELATED APPLICATION

This application claims the benefit of the filing date of Provisional Application Ser. No. 61/395,838 filed 18 May 2010.

BACKGROUND OF THE INVENTION

1. Field of the Invention

This invention relates to a decoy apparatus for use by a hunter for wild fowl, in particular, large birds such as turkeys and geese. The invention comprises an improvement in means for easily and quickly anchoring the decoy with a strut through the middle of its body. The assembly comprises two essentially rigid struts, the inner strut being nearly completely concealed within the outer strut. By "essentially rigid strut" is meant that each strut resists deformation upon compression so that the inner strut, when manually grasped, may be thrust into the ground without fracturing it. The outer strut necessarily includes a longitudinal bore, that is, it is tubular; the inner strut may be either tubular or solid. When the decoy is deployed in a standing position by anchoring it in the ground with the strut assembly, the outer tubular strut is the upper strut and the inner strut is the lower strut. When the decoy is anchored, a portion of the strut assembly protrudes through the decoy's lower body for a distance approximating the length of the leg of a live bird. The end of the lower or inner strut is tapered and pointed to facilitate thrusting the tapered end of the lower (inner) strut into the ground upon which a live wild bird is to be enticed and, then, expected to alight. When the decoy is so anchored, the body which is a molded likeness of the bird, produces the visual impression of a live bird standing on the ground.

2. Brief Description of the Prior Art

A hunter seeking to attract a particular wild bird to a particular patch of ground typically chooses to use a decoy to do so. The decoy is a molded likeness of a bird calculated to attract another bird of the same species. For example, to attract a wild turkey, a hunter would use one of numerous, commercially available turkey decoys which mimic a live turkey, most of which decoys are currently mass produced.

The feet of the decoy in use are usually represented by a single strut, because it has been found that a live bird appears to accept this simple means for anchoring the body of the decoy as representative of another wild bird of the same species. Most commonly used for the strut in the prior art, is an assembly of two rigid plastic struts (typically cylindrical tubes) each having approximately the same cylindrical cross-section and a wall thickness in the range from about 1 mm-2 mm. The relative vertical positioning of the two struts is interchangeable, that is, either strut may be used as an upper strut or a lower strut because each strut is provided with a tapered end. One end of the assembly is removably thrust upwardly from below the body of the decoy, through a lower body aperture, and into an upper aperture typically provided by a doughnut-shaped washer laterally positioned within the upper surface of the body of the bird. Though a single aperture may be provided to mimic the decoy in any standing position, it is preferred to provide two approximately linearly aligned, first (mid-body) and second (aft) apertures. Each aperture is typically reinforced by a doughnut-shaped washer positioned so that the washers are longitudinally spaced apart a distance of from 3" (ins)-5" (ins), preferably about 4" on a typical mature turkey, along the longitudinal center line of the main body. The diameters of the first and second apertures are each in the range from about 0.5 cm-1.5 cm, preferably about 1 cm in diameter.

A "standing" turkey may be in either the "sentry" or the "feeding" positions. When the tapered upper end of the strut is thrust into the first aperture (first or fore washer) which is located at about the midsection of the body of the bird, approximately above the center of mass of the decoy, it mimics a standing turkey said to be in the "sentry" position. When the tapered upper end of the strut is thrust into the second aperture (second or aft washer) which is located aft of the first washer, and about midway between the first washer and the end of the body from which end the tail feathers protrude, the decoy mimics a standing turkey with its head near the ground, said to be in the "feeding" position.

Before the above-described prior art decoy is anchored, the tapered upper end of the upper strut is thrust into either of the washers, so that the tapered upper end of the strut is loosely held in the washer. Because the washer rests on the tapered upper end, the weight of the body keeps it positioned on the tapered upper end so that the body of the decoy is free to rotate about a vertical axis provided by the upper strut without the tapered upper end of the upper strut being attached to the body with any attachment means. The strut assembly is thus assembled on site and unsecured when it is thrust into either the first washer (first aperture) or the second washer (second) aperture.

In such prior art decoys, the two tubular struts of the strut assembly are carried to a hunting site separately from the body of the decoy, that is, the assembly is not and cannot be secured within, and carried in the body of the decoy. Because the upper and lower struts of the assembly are each pointed to be thrust into a washer, they may be positioned vertically relative to one another so their positions are interchangeable. The upper strut is to be inserted in either one of the two apertures (i.e. a chosen washer) in the decoy when a hunter arrives at the location where the decoy is to be placed; then the lower strut is fitted into the lower end of the upper strut, then the decoy is deployed by thrusting the lower strut into the ground.

In practice, to anchor the decoy, the lower strut of the prior art strut assembly is preferably provided with a tapered end terminating in a pointed end more aggressively tapered and sharply pointed than the tapered and pointed end of the upper strut so that the lower end is readily insertable into ground upon which the targeted bird is expected to alight. Either the upper end of one of the struts (typically the lower strut), or the lower end of the other strut, terminates in an inwardly constricted cylindrical stub from about 2 cm-3 cm long. This stub is typically formed by circumferentially constricting the non-pointed end to provide the cylindrical stub having an outside diameter from about 0.005" to about 0.020" smaller than the inner diameter of the lower portion of the upper strut. The cylindrical stub allows one strut to be slidably snugly, preferably tightly, fitted, and removably insertable into the cylindrical end of the other strut to a distance which is necessarily less than fifty percent (50%), typically about 10% of the length of the stub, that is, the cylindrical lower portion of the upper strut is from about 2 cm-3 cm long; typically, the lower end of the upper strut is provided with the constricted cylindrical stub portion so that maximum force and pressure may be exerted on the upper strut, which force is snugly contained in the upper end of the lower strut, allowing the assembly to be thrust in relatively hard soil without breaking either strut.

The lengths of the upper and lower struts are typically approximately the same though the relative lengths are not narrowly critical so long as the portion of the assembly protruding from the lower surface of the decoy's body is such that it mimics a bird standing in either the sentry or the feeding positions. In general, the portion of the assembly protruding from the lower surface of the decoy's body is typically no more than 20% greater than the height of the bird's body measured from the top of the bird's leg to the upper surface of the body, which is typically in the range from about 8 ins. to 16 ins. depending upon the gender, age and size of the bird.

As stated, because the upper end of the upper strut of the commonly used prior art strut assembly cannot be fastened in the body of the decoy, only the upper and lower struts are generally pre-assembled (to avoid misplacing or losing one). When the hunting site is reached, the upper pointed end of the upper strut is thrust into the chosen first or second body aperture, and with the decoy now resting on the upper end of the strut without being securely fastened to the body, the sharp lower end of the lower strut is manually thrust into the ground by tightly holding the protruding lower portion of the assembly, and forcing the lower end of the lower strut into the ground.

To facilitate locating the chosen aperture with the pointed upper end of the upper strut, the lower body of the decoy is typically provided with a longitudinal slotted opening which extends from near the molded tail feathers to a location spaced apart from the lower body aperture for insertion of the strut. The slotted opening is typically from about 3 ins.-6 ins. long and serves a dual purpose; (i) the slot allows the hunter to sight the chosen first or second aperture through the inner enclosed space of the hollow body (if there is enough light available) so as to insert the pointed upper end of the upper strut, and (ii) the slot facilitates folding the body of the decoy into a compact mass for shipping or carrying multiple decoys simultaneously.

The Problem:

Referring specifically to wild turkeys, they are well known both, for their skittishness and also their propensity to feed in the early hours of the day. It is therefore generally necessary to deploy the decoy(s) just before dawn when there is little light. When the folded body of the decoy is unfolded, it autogenously expands (that is, self-expands) to form the body of the turkey. Then the struts (typically a dark color to mimic the dark color of the bird's feet) of the strut assembly are to be identified and, if not preassembled, the upper end of the lower strut is tightly fitted into the lower end of the upper strut—not so easily done in poor light, given the close tolerance between the cylindrical stub of the lower strut and the inner diameter of the upper strut. The upper end of the upper strut of the assembly is then to be inserted in one of the apertures to present the decoy in the chosen position. In poor lighting conditions, it is easy to find the lower aperture in the lower body and to thrust the upper tube of the assembly through the lower body aperture, but it is difficult to see the first and second apertures in the upper surface of the body of the decoy, so it is difficult to thrust the tapered upper end of the upper strut of the assembly into a chosen aperture so as to present the bird in the position of choice.

The foregoing is an age-old problem which hunters have coped with ever since it was found that an excellent replica of a wild fowl, particularly of a turkey or goose, is readily molded to form a shaped form having a relatively uniform wall thickness, the wall, typically from 1 mm to 5 mm thick, enclosing a large body cavity having only a slightly smaller volume than that of the entire body.

Moreover, the physical properties of affordable rigid plastic struts (tubes) are such that, to withstand the force of being thrust into hard ground, a practical outer diameter of the tubes of the assembly is at least in the range from about 1 cm to 1.5 cm, and the tapered lower end is tapered to a point over a distance of about 2 cm to 3 cm so that the tapered end is more readily inserted into the ground and resists being broken when forcibly thrust into the ground. Thus, if the ground is hard, as it typically is, it becomes necessary to drive a steel rod into the ground to form a bore into which the tapered lower end of the lower tube can be inserted.

Still further, if one happens to drop one of the darkly colored struts of the prior art assembly while attempting to assemble the struts in the field, it is necessary to hunt for and find the missing strut in poor light, before the struts can be assembled.

SUMMARY OF THE INVENTION

A turkey decoy comprises a mass-producable synthetic resinous (plastic) body having a shaped form resembling a live turkey, the decoy adapted to be supported in either a sentry or feeding position, with a pre-assembled single telescopable assembly comprising two struts, no linkages, and no moving parts, and the strut assembly, in turn, may be preassembled in the decoy by being removably securely fastened in an aperture for either position before setting out for the hunting site. Upon reaching the site, the decoy is self-inflated and the lower end of the strut assembly is thrust into the ground.

Such an assembly comprises two essentially inflexible, upper (outer) and lower (inner) struts, the upper strut necessarily being tubular, and the lower being either tubular or solid, such that at least 50% of the inner strut is telescopable within the outer strut. Upon being secured in the decoy, neither strut in the assembly is detachable relative to the other because the upper strut is removably securely fixed in an aperture in the upper surface of the decoy's body at any chosen time prior to deploying the decoy. The upper end of the upper (outer) strut is provided with cooperating means to permit the strut to be removably securely fastened, from under and through the body cavity, to the underside of the upper wall of the body. The strut assembly of non-detachably assembled struts is typically secured in the decoy long before the decoy is to be deployed, and can only be locked in a single position when deployed, that is, fully extended; the function of the strut assembly is to support the deployed decoy in the desired position.

BRIEF DESCRIPTION OF THE DRAWING

The foregoing invention will best be understood by reference to the following detailed description of the decoy assembly and of a particular strut assembly representative of one to be used in conjunction with the decoy, accompanied with schematic illustrations in which like reference numerals refer to like element, and in which.

DETAILED DESCRIPTION OF PREFERRED EMBODIMENTS

The decoy of the present invention will be described referring to a wild fowl shaped in the form of a turkey hen, jake or gobbler, though it will be evident that the hollow body cavity of any wild fowl can be used as a decoy which is to be anchored to the ground in a generally standing position.

Figure 1:
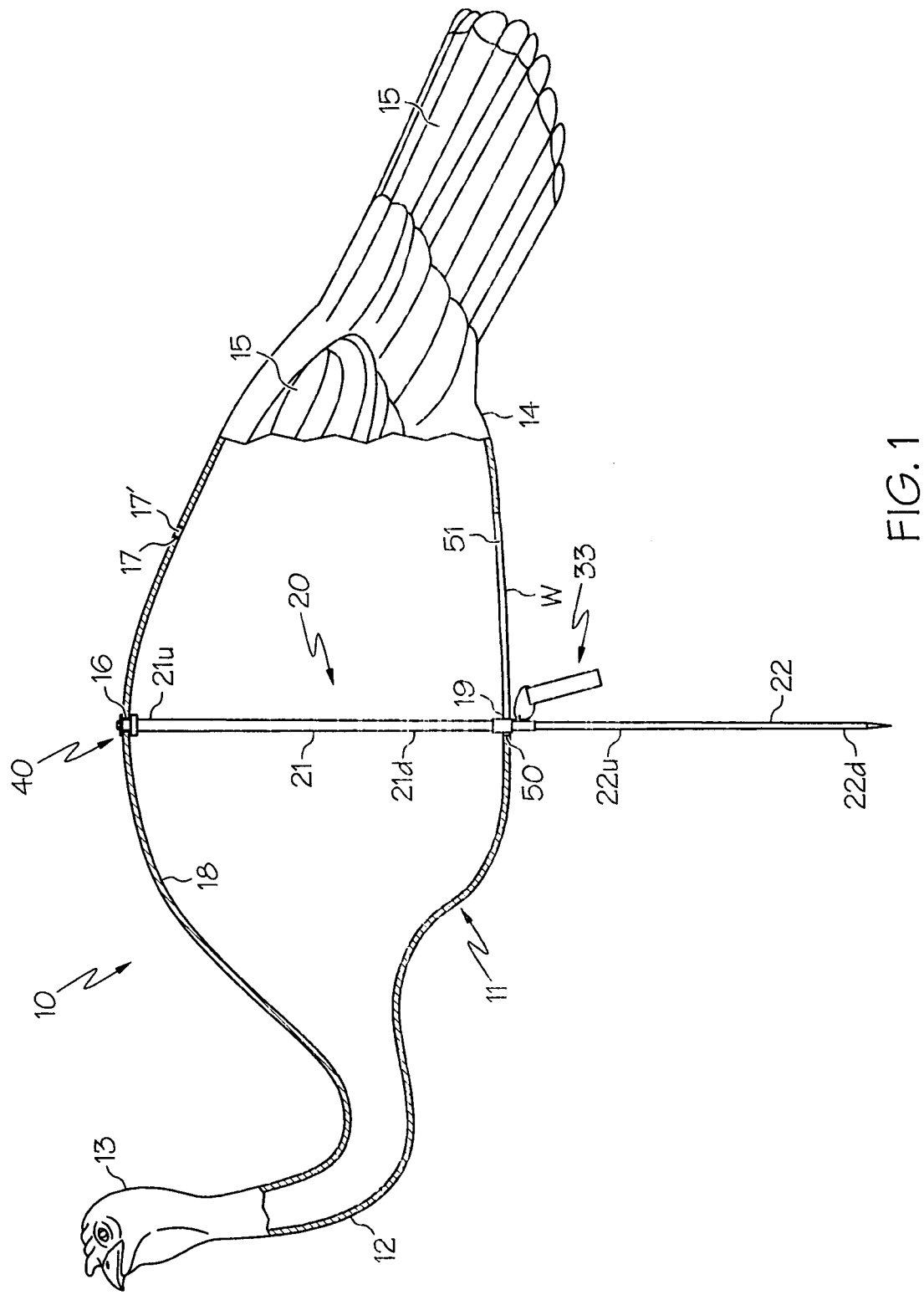
FIG. 1 is a side elevational view of a standing turkey, decoy in the "sentry" position with the telescopable strut assembly fully extended.

Referring to FIG. 1, there is schematically illustrated the body of a turkey hen, referred to generally by reference numeral 10, which body includes the main body 11 and its neck 12 on which is carried its head 13. The main body 11 terminates in a tail 14 from which feathers 15 project. Doughnut shaped washers 16 and 17 provide fore and aft apertures 16' (see this one in FIG. 5) and 17' respectively, longitudinally spaced apart along the centerline of the main body.

The entire body of such a turkey decoy is typically hollow and formed from "plastic". The term "plastic" is used to refer generically to a synthetic resinous material such as a polyolefin, polvinylaromatic resin, block copolymers of dienes including synthetic rubbers, and blends or mixtures thereof. The plastic used may be foamed, that is, molded so as to produce a cellular body with a textured continuous skin, which in practice, is the outer surface of the mold into which surface the shapes of the feathers 15 are molded and appropriately colored. Such a mold typically produces a hollow body having a wall W of thickness in the range from about 0.5 cm to about 1.5 cm, with a well-formed and well-shaped head and neck replicating the features of a live bird, and also, superficial details of the bird molded into the body's entire surface so as to imitate the feathers of the bird. The head and feathers are appropriately colored, depending upon the positions of the feathers, to resemble the chosen bird. Preferably, the entire body is foamed and foldable to facilitate carrying the decoy, particularly when several decoys are to be carried to a particular location. Turkey decoys such as those generally described hereinabove are commonly commercially available.

Secured within the body 11, about the midpoint between the base of the neck 12 and the tail 14, is a first embodiment of a strut assembly generally referred to by reference numeral 20, having telescoped upper and lower struts 21 and 22 respectively. The strut assembly 20 is thrust, tubular upper strut 21 first, through lower body strut aperture 19 in the lower portion of the body. The diameter of the aperture 19 is large enough to allow upper portion 21u to pass through the aperture 19. The location of the aperture 19 is such that when the upper portion 21u of the upper strut 21 is secured in one of the donut washers 16 or 17 and the lower strut 21 is extended, the decoy resembles a live bird standing on its legs.

The lower strut 22 of the assembly 20 is preferably tubular (hence, lower or "inner" tube) because it is typically more economical to produce than a solid lower strut. The lower strut 22 is downwardly tapered so that the outside diameter of its upper portion 22u (see FIG. 2) near its upper end is greater than the outside diameter of its lower portion 22d near its lower end, providing the strut 22 with a predetermined taper; and, the outside diameter of the upper end 22u of the lower strut 22 is greater than the inner diameter of the lower end 21d of the upper strut 21 of the assembly. The lower end 22d of the lower strut terminates in a pointed end 30 to be thrust into the ground. Thus configured, when the strut assembly 20 is extended by pulling the inner (lower) strut through the outer (upper) strut, to fully extend the strut assembly, the upper end 22u of the lower strut 22 is locked into the lower end 21d of the upper strut 21 with an interference fit. The upper end 21u of the outer strut is provided with a "top-hat shaped" end 40 which provides cooperating means into which a fastening member may be threaded, thrust or otherwise secured such that upon direct downward pressure on the top of the top hat assembly 40, pressure sufficient to drive the pointed end 30 into the ground does not unlock the inner and outer struts.

It will be understood that the lower (inner) strut 22 is first to be inserted into the upper (outer) strut 21, tapered end first, to form the strut assembly 20. The decoy, ready to be deployed, is thus preassembled with the strut assembly in the decoy, with the lower (inner) strut 22 inserted into the upper (outer) strut 21 from above it.

When the assembly 20 is collapsed, the inner (lower) strut 22 is substantially telescopable within the outer (upper) strut 21. By "substantially telescopable" is meant that at least 50% of the length of the inner strut 22 is slidable within the outer strut 21 when the assembly is collapsed. Preferably the inner (lower) strut is fully telescopable within the outer (upper) strut 21. By "fully telescopable" is meant that at least 75%, preferably at least 85% of the length of the inner strut 22 is slidable within the outer strut 21 when the assembly is collapsed. In the fully telescopable position, upper end 22u of the inner 22 strut reaches near the upper end 21u of the outer strut 21.

In a first embodiment, only the pointed end 30 of the lower strut 22 (shown in FIG. 2), preferably protected with protective cap 33, protrudes for a distance from about 5% to 20% of the height of the decoy's body. The upper end 21u of upper strut 21 is provided with cooperating means 40 which in combination with fastening means 45 (see FIG. 2) secures the strut in the main body 11.

In another embodiment the inner (lower) strut 22 is telescoped 100% into the outer (upper) strut 21 so that the sharp point is hidden and unable to cause any inadvertent damage when the strut is being handled. The cooperating means 40 may be provided by a stepped cylindrical cap having a lower portion having an inner diameter such that the cap fits tightly fits over the upper end 21u of the upper strut; and an inwardly stepped upper cylindrical portion having an outer diameter small enough to be inserted through an aperture 16' or 17'. The stem of a thumb-tack shaped plug may be inserted into the inwardly stepped upper cylindrical portion to securely fasten the upper strut 21 in the body of the decoy. Other cooperating means with which the upper strut may be securely fastened within the body of the decoy will occur to one skilled in the art; the manner in which the upper end 21u of the upper strut 21 is removably securely fastened in the decoy is not narrowly critical.

Preferably, the upper (outer) and lower (inner) tubular struts 21 and 22 respectively are each downwardly tapered over their entire lengths with matching tapers so that the inner strut 22 is smoothly slidable within the outer strut 21 until the outside diameter of the lower end of the upper strut 21 is less than the outer diameter of the upper portion 22u of the lower strut 22 of the assembly, when there is an interference fit between the inner and outer struts, and the inner strut is so tightly locked within the upper (outer) strut that the fully extended strut can be pushed into the earth by pressure on its upper end, without collapsing the fully extended assembly.

Figure 2:
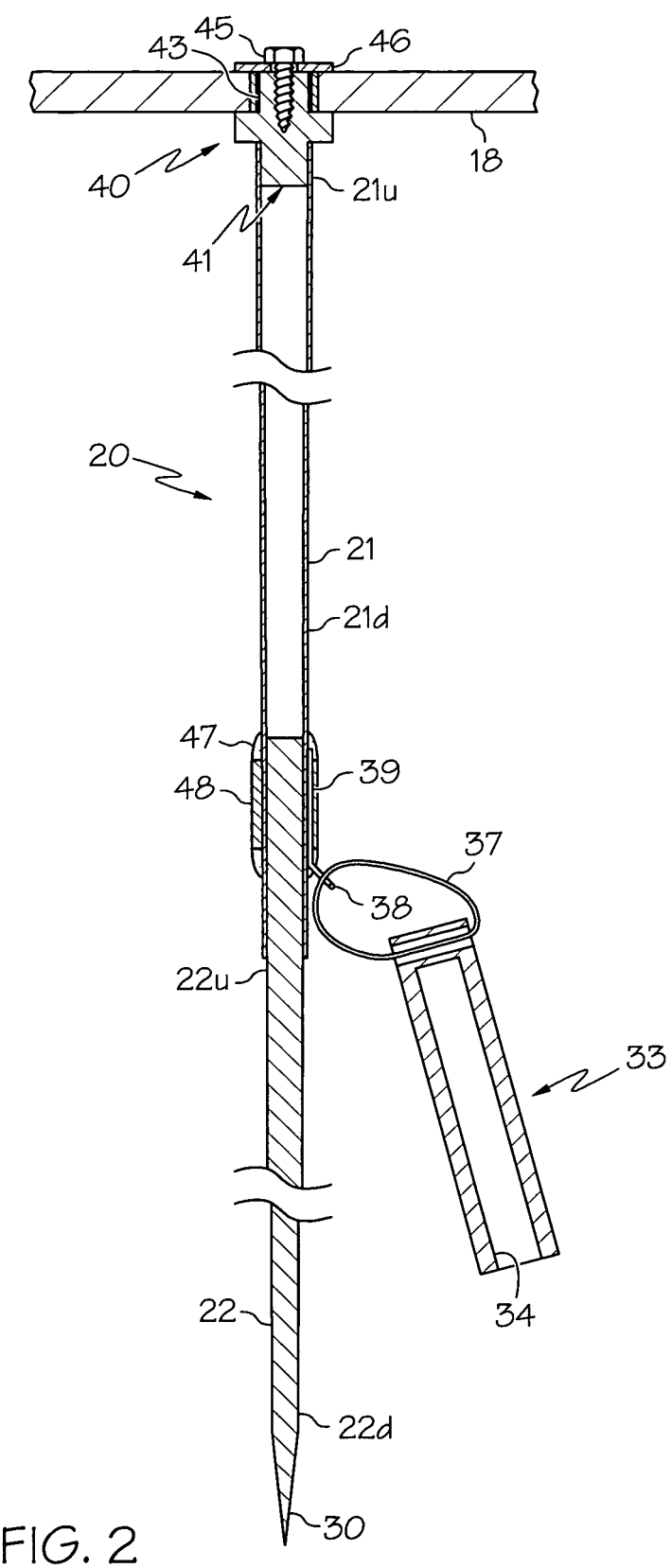
FIG. 2 is a longitudinal cross-sectional view of a first embodiment of the strut assembly in its fully extended position, with the upper portion of the inner strut locked in the lower portion of the upper strut.
Figure 5:
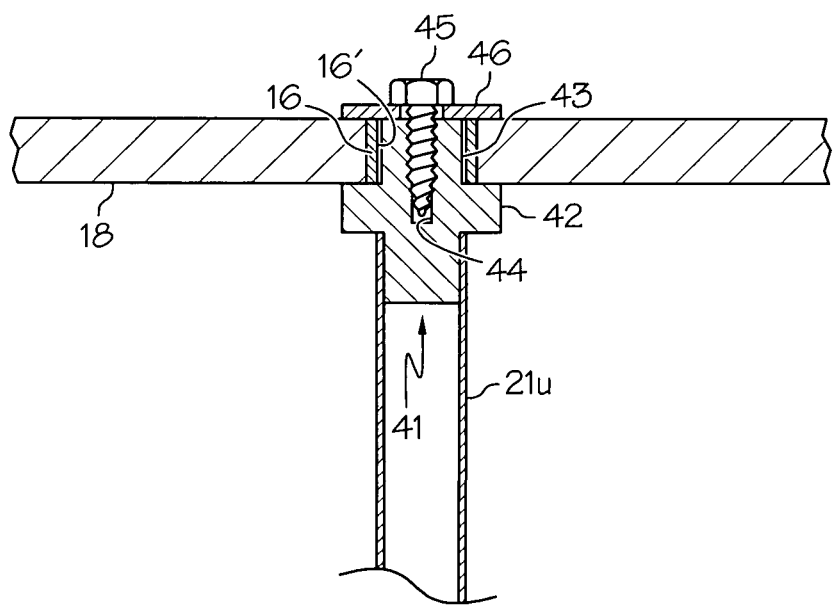
FIG. 5 is an enlarged detail cross-sectional view of the top-hat shaped upper end of the upper strut to show how the upper strut is removably fixed in the main body.

Referring further to FIG. 1 and FIG. 2, and to FIG. 5 in particular, illustrating the first embodiment, there is shown a "top-hat shaped end" 40 in the upper end 21u of the upper tubular strut 21 is preferably provided with a non-removable cylindrical cross-shaped plug 41. The plug 41 has an integral peripheral flange 42 from which protrudes a cylindrical stub ("plug's stub") 43. The plug's stub 43 is inserted in a chosen doughnut-shaped washer 16 or 17 (shown in FIG. 1 but not in FIG. 2) of the body's upper wall 18, and the strut assembly 20 is detachably fastened to the body 11 so that it (the body 11) is rotatable about the plug's stub 43. Conveniently, an axial bore 44 in the plug's stub 43 allows it to be secured, typically with a threaded screw 45 provided with a washer 46. Though the assembly 20, and its upper end 21u (of the upper strut 21) is thus detachably secured in the aperture of choice in the upper surface of the body of the decoy, there is no reason to detach the strut assembly 20 unless it is damaged. The strut assembly is thus an integral part of the decoy when it is transported to a location where the decoy is to be deployed.

Figure 3:
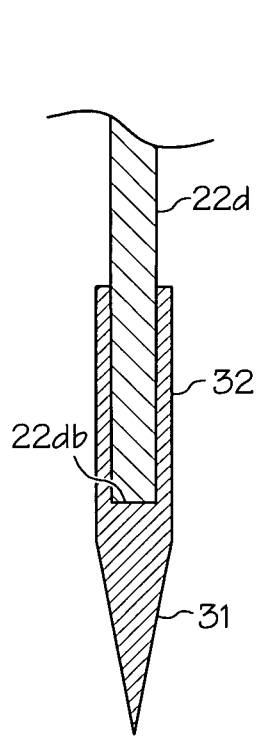
FIG. 3 illustrates the lower end of the inner (lower) strut shrink-fitted or otherwise tightly secured within a metal pointed end.

The struts may be made of any material which can be economically formed into rigid struts, e.g. metal or plastic, preferably reinforced with a filler such as glass fiber, being preferred for manual insertion into hard ground. As shown in FIG. 3, for cost reasons, the lower end 22d of the inner strut 22 may be a non-pointed or blunt end 22db, and the blunt end 22db is provided by a sharply pointed cap 31 of steel or other rigid metal having an upper portion 32 slidably fitted over and adhesively bonded or otherwise tightly fitted over the lower blunt end 22db to make the lower (inner) strut manually readily insertable, even in hard ground.

Figure 4:
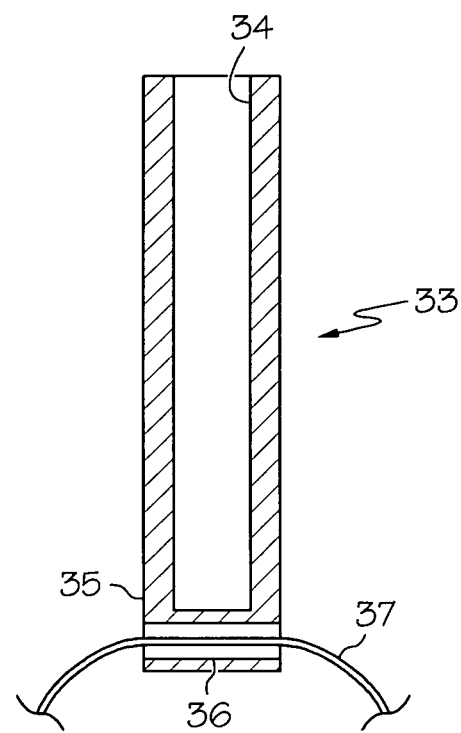
FIG. 4 illustrates a protective cap which may be placed over the pointed end of the lower strut to provide safe handling of the strut and prevent inadvertent piercing of hand and adjacent objects carried with the decoy.

Referring to FIG. 4 there is shown a detail cross-sectional view of a protective cap 33, typically molded from a plastic material such as polypropylene which may be placed over the pointed end of the lower strut to provide safe handling of the strut and to prevent inadvertently piercing a hand or objects closely packed with, and carried with the decoy. The cap 33 is typically cylindrical, and provided with a central cylindrical cavity 34 to snugly accommodate the pointed end 30 or 31 of an inner (lower) strut. At any convenient location on the protective cap 33, preferably in its lower portion 35 near its bottom, the cap is provided with a lateral bore 36 through which the first end of a fastening means 37, preferably a rubber band 37, is threaded. Such fastening means may be conveniently provided by an elastic cord or band 36 which is secured in the lower portion of the cap. As will be evident, the cap is to be placed over the pointed end 30 or 31 only when the strut assembly 20 is in the fully collapsed position.

The second end of the fastening means 37 is conveniently secured to an attachment means 38 such as a loop having a base portion 39, secured to the outer surface of the lower portion 21d of the upper (outer) strut 21. The loop 38 is preferably adhesively secured by embedding its base portion 39 in a hard-setting resin 47 such as an epoxy, and wrapping the base portion 39 with glass-reinforced tape 48 which is tightly fixed to the lower end 21d of the upper strut 21, when the epoxy is cured.

Figure 6:
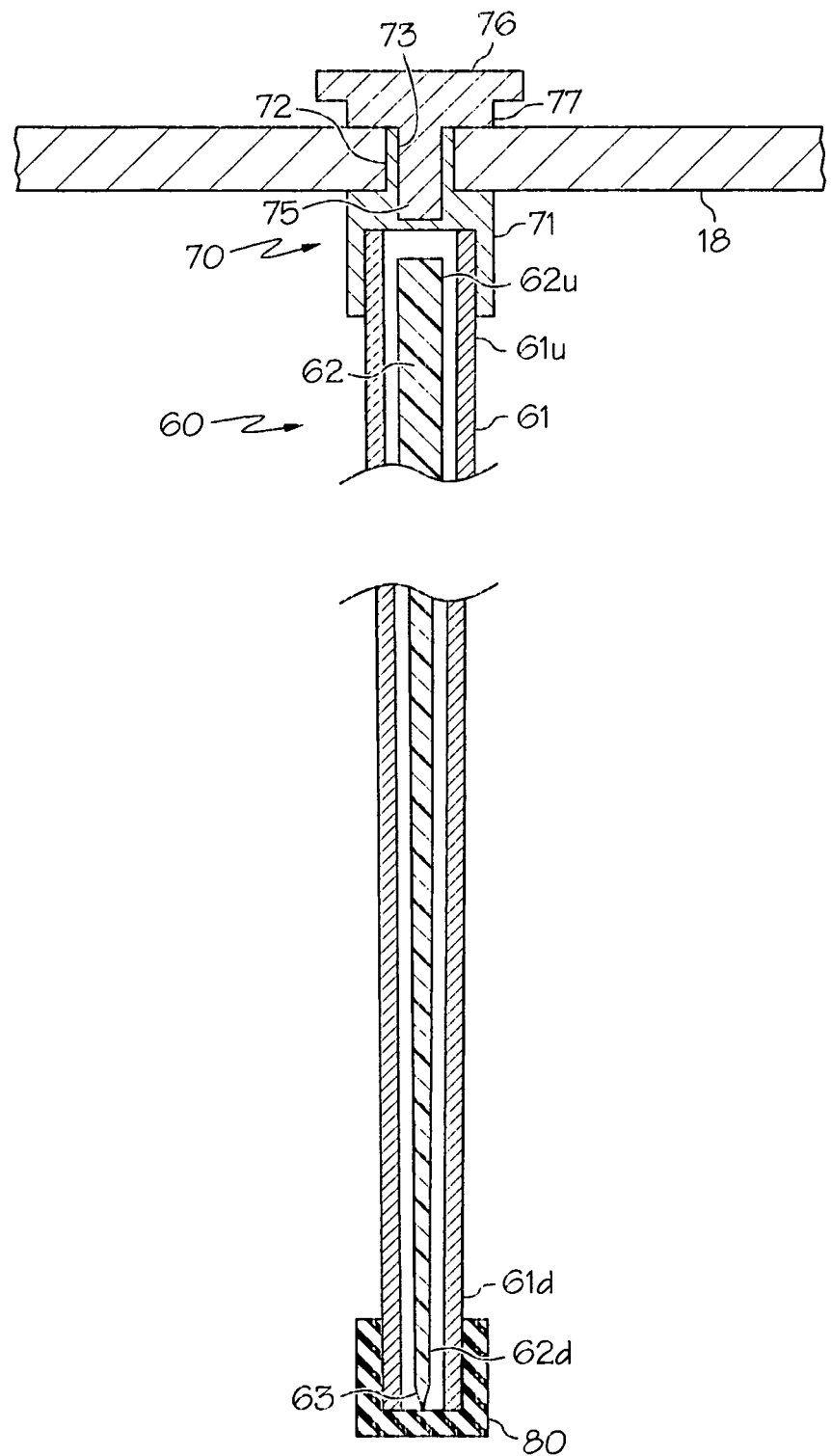
FIG. 6 is a longitudinal cross-sectional view of a second embodiment of the strut assembly in its fully extended position, with the upper portion of the inner strut locked in the lower portion of the upper strut.

Referring to FIG. 6, there is schematically illustrated a second embodiment of the telescopable strut assembly 60 in cross-section, with the intermediate portions of the upper and lower struts broken away, secured in a donut washer (not shown, for clarity) of the upper wall 18 of the decoy. As before, the strut assembly 60 is thrust, upper (outer) tubular strut 61 first, through lower body strut aperture 19 which is large enough to allow upper strut 61u to pass through the aperture 19. Length of lower (inner) strut 62 is preferably greater than 85 percent of the length of the upper strut 61 (>0.85 the length of upper strut 61) so that the inner strut 62 may be concealed within the outer strut 61 when the lower end 61d of the upper strut 61 is fitted with a snugly fitting cap 80.

Analogous to the assembly described hereinabove, the lower strut 62 is downwardly tapered so that the outside diameter of its upper portion 62u near its upper end is greater than the outside diameter of its lower portion 62d near its lower end, providing the strut 62 with a predetermined taper; and, the outside diameter of the upper end 62u of the lower strut 62 is greater than the inner diameter of the lower end 61d of the upper strut 61 of the assembly. The lower end 62d of the lower strut terminates in a pointed end 63 to be thrust into the ground. Thus configured, when the strut assembly is extended by pulling the inner (lower) strut through the outer (upper) strut, into the fully extended position, the upper end 62u of the lower strut 62 is locked into the lower end 61d of the upper strut 61 with an interference fit such that direct downward pressure on the top of top hat assembly 70, the pressure sufficient to drive the pointed end 63 into the ground, does not unlock the inner and outer struts.

Top hat assembly 70 includes a stepped nozzle having a lower capping portion 71 and an upper nozzle portion 72 coaxial with the lower capping portion 71. The capping portion 71 is tightly, preferably removably secured over the upper end of upper portion 61u of upper strut 61 to cap it; the nozzle portion 72 has an outer diameter chosen so that the nozzle portion may be inserted into a donut washer 16 or 17 (see FIG. 1). The nozzle portion 72 has a bore 73 into which a plug-end 75 is tightly, removably fitted. The plug-end 75 protrudes from a stepped cylindrical plug having a base 76 and a stepped portion 77. The upper wall 18 is thus held between the lower surface of the stepped portion 77 and the upper surface of the capping portion 71 so that the body 11 is rotatable about the plug-end 75 and the upper strut 61.

The assembly 60 is thus detachably secured to top hat assembly 70 in an aperture of choice in the upper wall 18 of the body of the decoy, there is no reason to detach the strut assembly 60 unless it is damaged. The strut assembly is thus an integral part of the decoy when it is transported to a location where the decoy is to be deployed.

Though the lengths of the outer and inner struts are chosen so that the fully extended assembly mimics a live turkey standing, in this second embodiment of the invention it is preferred to choose the lengths such that the outer strut is as long as the body 11 of the turkey is high; and the length of the inner strut 62 is such that, when capped with cap 80, only the cap 80 and a small portion, less than 10% of the length of the inner strut 62, protrudes from the body. For best effect, it is preferred that the inner strut 62 be a solid cylindrical tapered strut of a hard plastic material such as nylon.

A typical molded decoy having a large body cavity is formed by shaping the body so as to have its wall 18 enclosing a large body-shaped cavity with one or both apertures 16 and 17 in the body's upper surface. In addition, the lower body is provided with a lower body opening 50 (see FIG. 1) approximately vertically below front (fore) aperture 16 through which opening 50, the strut assembly is to be inserted. A large body cavity makes it convenient to thrust the strut 20 through the same opening 50, and insert the cylindrical stub 43 of the top-hat shaped upper end 40 of the strut assembly 20 to be inserted into the rear (aft) aperture 17 in the upper body's surface, to position the decoy in the feeding position.

Of course, the decoy may be molded of foam in such a way as to provide only a relatively narrow vertical cavity through which both the front (fore) and rear (aft) apertures may be accessed by the cylindrical stub 43, but it is typically more economical to produce a decoy with a very large cavity and a wall thickness which permits the molded decoy to be folded so as to make a compact package.

It is not necessary that a molded decoy be folded, and a substantially solid body formed of cellular foam such as foamed polystyrene will not be foldable. But if the large cavity, relatively thin-walled decoy is desired to be folded, to facilitate folding such a molded decoy, the wall of the lower body is provided with a longitudinal slot 51, referred to as a slotted bottom, which extends from adjacent the lower body opening 50 to a location under the tail 14.

The molded decoy having a large body cavity 50 formed by shaping the body 11 so as to have the wall 18 enclosing the cavity, is readied to be deployed by thrusting the strut assembly 20 including the "top-hat shaped" plug 40 (without the threaded screw 45 and washer 46) through the lower body strut aperture 19, and inserting the cylindrical stub 43 into a chosen doughnut shaped washer 16 or 17 forming aperture 16' or 17' respectively. The washer 46 is then placed over the chosen doughnut shaped washer and the screw 45 threaded into the bore 44 to lock the strut assembly 20 in position. The decoy may then be folded to make a compact package; folding the decoy is facilitated if the lower body is provided with a longitudinal slotted opening 51, aft the aperture 19, typically provided in a currently commercially available decoy.

For tubular struts of glass-fiber reinforced plastic, the matching tapers of the outer and inner struts, which taper allows the inner strut to be slidable within the outer strut and locked in the lower portion thereof, is preferably in the range from about 0.02"/ft-0.1"/ft (inch per foot). Most preferred is a taper of about 0.055"/ft or about 0.26°/ft. A typical telescopable strut assembly may be illustrated as follows:

Upper strut 21—
  outside diameter of upper portion 21*u* (near its upper end) —0.40"
  outside diameter of lower portion 21*d* near its lower end— 0.295"
  length of upper strut 21 (without the cross-shaped plug) —10."
  taper of upper strut 21 is 0.105" over a length of 10"

Assuming the wall thickness of the strut is substantially uniform over its length, the taper of the bore of the upper strut is also 0.105" over its length of 10".

Lower strut 22—
  outside diameter of upper portion 22*u* near its upper end— 0.35"
  outside diameter of lower portion 22*d* near its lower end— 0.207"
  length of lower strut (without the pointed end) —10."
  taper of lower strut is 0.143" over a length of 10"

Assuming the wall thickness of the strut is substantially uniform over its length, the taper of the bore of the upper strut is also 0.143" over its length of 10".

It will be evident a Morse taper will be chosen depending upon the relative lengths and diameters of the outer and inner struts 21 and 22 respectively, to be used in an assembly. Similarly it will be appreciated that the type of pointed end provided on the inner (lower) strut 22 will depend upon the durability required, the type of ground on which the decoy is to be deployed, and the acceptable cost of providing the desired inner strut.

It will be appreciated, that when the decoy is deployed in a standing position, the lower strut supports the body of the decoy at a distance above the surface of the ground which distance is comparable to the height of a live turkey standing on its feet. This height is typically in the range from about 6" to 12".

Typically the length of the upper (outer) strut without the cross-shaped plug is greater than the length of the lower (inner) strut, since the upper strut traverses through the body of the bird. Such an upper (outer) strut is in the range from 10"—14", preferably about 12". The lower (inner) strut without being fitted with an additional pointed metal end, is in the range from 8"—12", preferably about 10".

Having thus provided a general discussion, described the decoy in detail and illustrated the invention with a specific example of the best mode of making and using the decoy, it will be evident that the invention has provided an effective solution to an age-old problem. It is therefore to be understood that no undue restrictions are to be imposed by reason of the specific embodiments illustrated and discussed, and particularly that the invention is not restricted to a slavish adherence to the details set forth herein.

What is claimed is:

1. A telescopable strut assembly removably secured within a decoy shaped in the form of a wild fowl, the decoy including a main body having an upper body with an underside, a neck supporting a head of the wild fowl, and a lower body including a tail,
  the strut assembly having (i) a tapered upper strut with an upper end having cooperating means adapted to receive a fastening means for removably fastening the strut assembly to an upper surface of the main body at any time prior to deploying the decoy, and, (ii) a tapered lower strut having a pointed lower end manually insertable into the ground upon which the decoy is to be deployed, thus supporting the decoy in a standing position, the upper strut being non-detachably held relative to the lower strut in the assembly when the decoy is deployed, at least 50% of a length of the lower strut being telescopable within the upper strut,
  the upper and lower struts each having a taper such that a lower end of the upper strut has an inner diameter smaller than an outer diameter of the lower strut so as to lock the lower strut only in a fully extended position before the pointed lower end is inserted into the ground upon which the decoy is to be deployed, and,
  the fastening means to secure the cooperating means to the underside of the upper body.

2. The telescopable strut removably secured within a decoy shaped in the form of a wild fowl of claim 1 wherein the upper strut has tethered to a lower end thereof a cylindrical cap which is snugly fitted over the pointed lower end to protect the pointed lower end of the lower strut when the pointed lower end is telescoped into the upper strut.

3. A decoy for wild fowl, comprising:
  a decoy shaped in the form of a desired wild fowl including a body having a neck supporting a head of the wild fowl, a main body portion having an upper body with an underside and a tail, and,
  a telescopable strut assembly having (i) a tapered upper strut having a lower end with a smaller inner diameter than an inner diameter of an upper end of the tapered upper strut and the upper end having cooperating means adapted to receive a fastening means for removably fastening the strut assembly to an upper surface of the main body portion at any time prior to deploying the decoy, and (ii) a tapered lower strut with an upper end having a larger outside diameter than the inner diameter of the lower end of the tapered upper strut, and having a pointed lower end manually insertable into the ground upon which the decoy is to be deployed, thus supporting the decoy in a standing position, the upper strut being non-detachably held relative to the lower strut in the assembly when the decoy is deployed, at least 50% of a length of the lower strut being telescopable within the upper strut, the main body portion having (a) at least one upper body aperture located through the upper surface of the main body portion and along a longitudinal center line of the main body portion so as to position the decoy in a standing position when the cooperating means is inserted from under and through the main body portion, into the at least one upper body aperture, so as to place the cooperating means in abutment against the underside of the upper body, and, (b) a lower body opening having a diameter greater than that of the cooperating means at the upper end of the upper strut, through said lower body opening the cooperating means and the upper strut are inserted, the fastening means to secure the cooperating means to the underside of the upper body, and, the upper and lower struts each having a taper such that the inner diameter of the upper strut lower end being smaller than the outside diameter of the lower strut upper end so as to lock the lower strut only in a fully extended position before the pointed lower end is inserted into ground upon which the decoy is to be deployed.

4. The decoy of claim 3 wherein the main body portion is rotatable about the cooperating means.

5. The decoy of claim 3 wherein the main body portion has a cavity enclosed by a wall of molded plastic material.

6. The decoy of claim 5 wherein the at least one upper body aperture located through the upper surface of the main body portion further comprises two through-apertures located through the upper surface of the main body portion and along the longitudinal center line of the main body portion, a first aperture of said two-through-apertures located above about a center of mass of the body and a second aperture of said two-through apertures longitudinally spaced apart from the first aperture along the longitudinal center line of the main body portion, so as to selectively position the decoy in a position chosen from sentry or feeding.

7. The decoy of claim 3 wherein the body is foldable.

8. The decoy of claim 3 wherein the upper strut has tethered to the lower end thereof a cylindrical cap which is snugly fitted over the lower end of the upper strut to protect the pointed lower end of the lower strut when the pointed lower end is telescoped into the upper strut.

* * * * *